United States Patent
Kwon et al.

(10) Patent No.: US 9,146,646 B2
(45) Date of Patent: Sep. 29, 2015

(54) APPARATUS FOR GENERATING DRIVING SIGNAL

(71) Applicant: SAMSUNG ELECTRO-MECHANICS CO., LTD., Suwon-Si, Gyeonggi-Do (KR)

(72) Inventors: Yong Il Kwon, Suwon-Si (KR); Moon Suk Jeong, Suwon-Si (KR); Tah Joon Park, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 23 days.

(21) Appl. No.: 14/218,421

(22) Filed: Mar. 18, 2014

(65) Prior Publication Data

US 2015/0177874 A1 Jun. 25, 2015

(30) Foreign Application Priority Data

Dec. 24, 2013 (KR) .................. 10-2013-0162235

(51) Int. Cl.
*G06F 3/041* (2006.01)
*G06F 3/044* (2006.01)

(52) U.S. Cl.
CPC ...................................... *G06F 3/044* (2013.01)

(58) Field of Classification Search
None
See application file for complete search history.

(56) References Cited

U.S. PATENT DOCUMENTS

2011/0043227 A1* 2/2011 Pance et al. ............ 324/681
2014/0333370 A1* 11/2014 Itonaga .................. 327/541

FOREIGN PATENT DOCUMENTS

JP 2001-127615 A 5/2001

* cited by examiner

*Primary Examiner* — Joseph Haley
(74) *Attorney, Agent, or Firm* — NSIP Law

(57) ABSTRACT

There is provided an apparatus for generating a driving signal, the apparatus including: a first driving signal generation circuit generating a first driving signal; a second driving signal generation circuit generating a second driving signal, the second driving signal generation circuit including at least two transistors and a pulse generation unit; and a control unit controlling the first and second driving signal generation circuits so that they generate the first and second driving signals selectively.

10 Claims, 5 Drawing Sheets

APPARATUS FOR GENERATING DRIVING SIGNAL

CROSS-REFERENCE TO RELATED APPLICATION

This application claims the benefit of Korean Patent Application No. 10-2013-0162235 filed on Dec. 24, 2013, with the Korean Intellectual Property Office, the disclosure of which is incorporated herein by reference.

BACKGROUND

The present disclosure relates to an apparatus for generating a driving signal.

A touchscreen device, such as a touchscreen or a touch pad, is a data input device attached to a display device so as to provide an intuitive user interface, and has recently been widely used in various electronic devices such as cellular phones, personal digital assistants (PDA), and navigation devices. Particularly, as demand for smartphones has recently increased, touchscreens have increasingly been employed as devices allowing for various methods of data input in a limited form factor.

Touchscreens used in portable devices may be mainly divided into resistive type touchscreens and capacitive type touchscreens, depending on the manner in which touches are sensed. Among these, the capacitive type touchscreen has advantages of a relatively long lifespan and the ease of implementing various input manners and gestures, and thus it has been employed more and more. The capacitive type touchscreen is especially easy to implement a multi-touch interface compared to the resistive type touchscreen, and thus it is widely used in smartphones and the like.

The capacitive type touchscreen includes a plurality of electrodes having a predetermined pattern and the electrodes define a plurality of nodes at which a change in capacitance is generated due to a touch. In the plurality of nodes arranged on a two-dimensional plane, changes in self-capacitance or changes in mutual-capacitance are generated by touches, and coordinates of such touches may be calculated by applying, for example, a weighted average method to the changes in capacitance generated in the plurality of nodes.

Recently, touchscreen devices may detect touches proximate to a cover lens, as well as touches made directly to such a cover lens. A driving circuit, generating driving signals to be applied to a plurality of electrodes, applies different levels of driving signal when detecting a normal touch and when detecting a proximity touch causing minute changes in capacitance. In the case of having driving signals of different levels applied thereto, however, transistors having a low withstand voltage for generating a driving signal having a low voltage level may be disabled.

Further, touchscreen devices have recently been provided with a number of panels having various sizes, and noise may be introduced in the case of a large touch panel, as opposed to a small touch panel, so that it may be difficult to accurately detect touches. To overcome this, a large driving signal may be applied for driving the large touch panel. However, if a large driving signal is applied to a small touch panel, current consumption may be increased.

RELATED ART DOCUMENT (Patent Document 1) Japanese Patent Laid-Open Publication No. 2001-127615

SUMMARY

An aspect of the present disclosure may provide an apparatus for generating a driving signal capable of preventing a transistor having a low withstand voltage in a low-voltage driving signal generation circuit from being disabled due to a high-voltage driving signal.

According to an aspect of the present disclosure, an apparatus for generating a driving signal may include: a first driving signal generation circuit generating a first driving signal; a second driving signal generation circuit generating a second driving signal, the second driving signal generation circuit including at least two transistors and a pulse generation unit; and a control unit controlling the first and second driving signal generation circuits so that they generate the first and second driving signals selectively, wherein the first and second driving signal generation circuits have a common output terminal, a maximum voltage level of the first driving signal is higher than withstand voltages of the at least two transistors, one transistor among the at least two transistors is connected between the other transistor and the output terminal, a constant voltage equal to the withstand voltage is applied to the gate of the one transistor, and the control unit, when controlling the first driving signal generation circuit to generate the first driving signal, turns the other transistor off.

A maximum voltage level of a pulse signal output from the pulse generation unit may be lower than the withstand voltage.

The at least two transistors may be connected in series, the one transistor may be connected to the output terminal, and the other transistor may be connected to the pulse generation unit.

The control unit, when controlling the second driving signal generation circuit to generate the second driving signal, may turn the other transistor on.

According to another aspect of the present disclosure, an apparatus for generating a driving signal may include: a first driving signal generation circuit generating a first driving signal; a second driving signal generation circuit generating a second driving signal, the second driving signal generation circuit including at least two transistors and a pulse generation unit; and a control unit controlling the first and second generation circuits so that they generate the first and second driving signals selectively, wherein the first and second driving signal generation circuits have a common output terminal, a maximum voltage level of the first driving signal is higher than withstand voltages of the at least two transistors, one transistor among the at least two transistors has a drain thereof connected to the output terminal, a gate thereof to which a constant voltage equal to the withstand voltage is applied and a source thereof connected to the drain of the other transistor, and the control unit, when controlling the first driving signal generation circuit to generate the first driving signal, has the source of the other transistor to be floated.

A maximum voltage level of a pulse signal output from the pulse generation unit may be lower than the withstand voltage.

The source of the other transistor may be connected to the pulse generation unit.

The control unit, when controlling the first driving signal generation circuit to generate the first driving signal, may turn the other transistor off.

The control unit, when controlling the second driving signal generation circuit to generate the second driving signal, may turn the other transistor on.

The first driving signal generation circuit may include at least one transistor.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
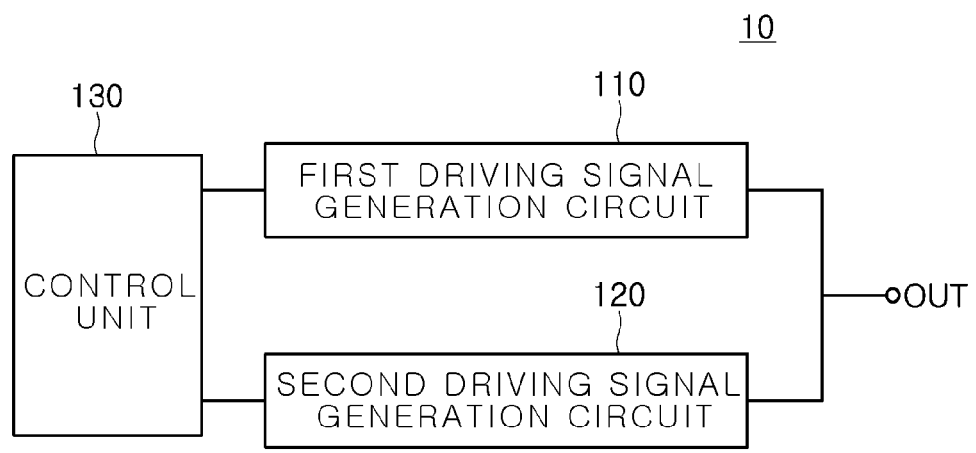
FIG. 1 is a block diagram of an apparatus for generating a driving signal according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a block diagram of an apparatus for generating a driving signal according to an exemplary embodiment of the present disclosure.

Referring to FIG. 1, the apparatus for generating a driving signal according to the exemplary embodiment may include a first driving signal generation circuit 110, a second driving signal generation circuit 120, and a control unit 130. The first driving signal generation circuit 110 and the second driving signal generation circuit 120 may have a common output terminal.

The voltage level of a first driving signal generated from the first driving signal generation circuit 110 may be higher than the voltage level of a second driving signal generated from the second driving signal generation circuit 110. If the voltage level of the first driving signal is higher than the withstand voltage of a transistor included in the second driving signal generation circuit 120, the transistor included in the second driving signal generation circuit 120 may be disabled by the first driving signal.

Figure 2:
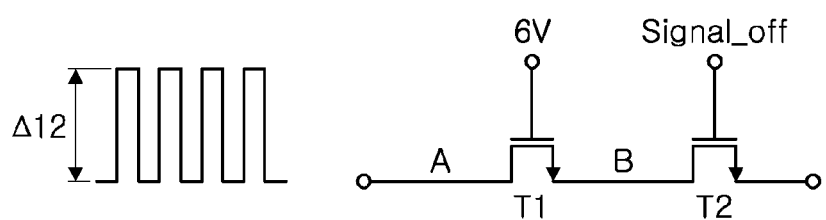
FIGS. 2 and 3 are diagrams illustrating the operating principle of an exemplary embodiment of the present disclosure.
Figure 3:
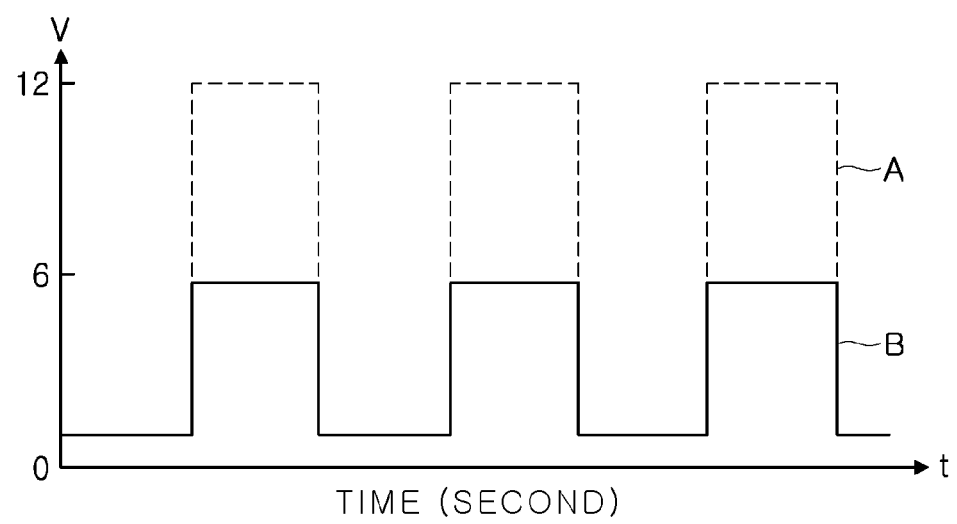

FIGS. 2 and 3 are diagrams illustrating the operating principle of an exemplary embodiment of the present disclosure. In FIG. 2, in the case that the withstand voltage of n-type transistors T1 and T2 is 6 V, the elements are disabled if a voltage above 6V is applied thereto. Since a pulse signal varying from 0 V to 12 V is applied to the drain of the transistor T1, the transistor T1 may be disabled. In order to prevent the transistor T1 from being disabled, an off signal Signal_off is applied to the transistor T2 so that it is turned off, and a constant voltage of 6 V is applied to the gate of the transistor T1. In this case, the pulse signal varying from 0 V to 12 V is dropped by the gate voltage such that a pulse signal varying from 0 V to 6 V is present at the source of the transistor T1.

That is, the maximum voltage difference between the source and the drain of the transistor T1 is 6 V, below the withstand voltage, and thus, the transistor T1 will not be disabled.

Figure 4:
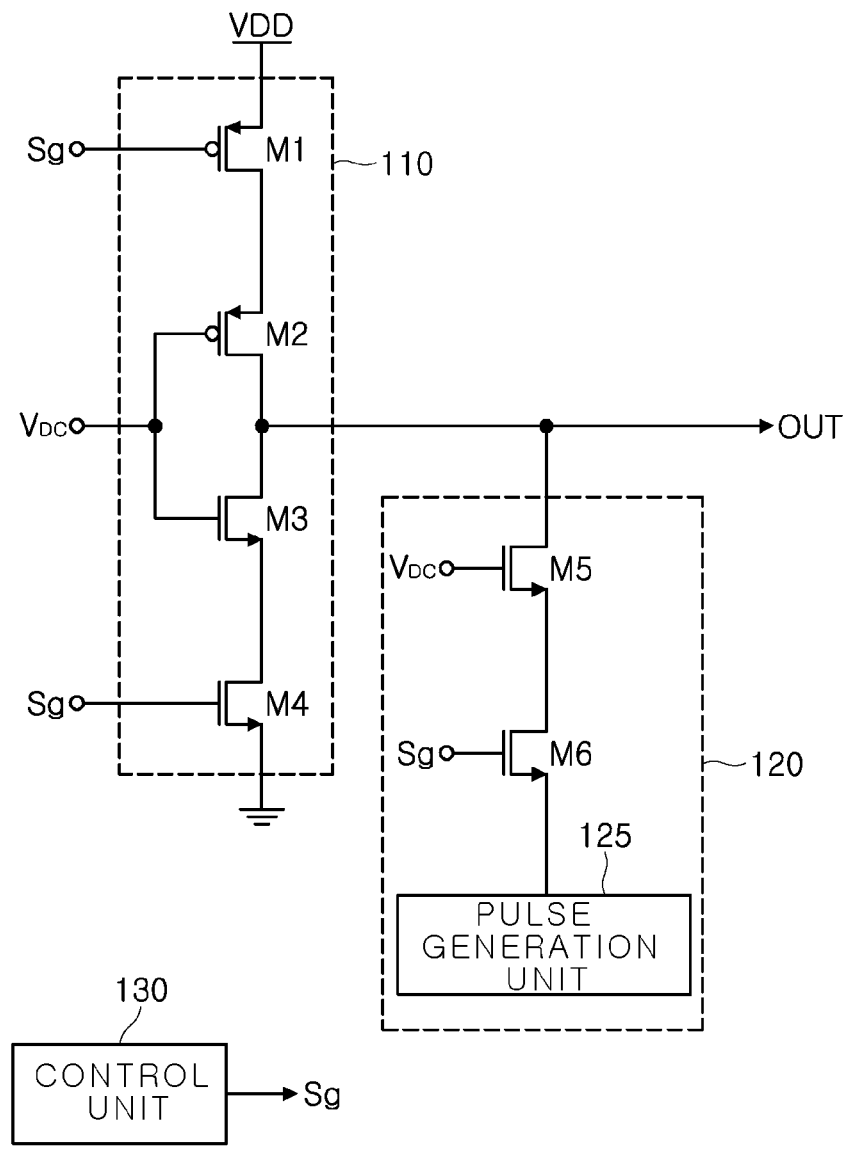
FIG. 4 is a diagram illustrating the apparatus for generating a driving signal according to the exemplary embodiment of FIG. 1 in more detail.

FIG. 4 is a diagram illustrating the apparatus for generating a driving signal according to the exemplary embodiment of FIG. 1 in more detail.

The first driving signal generation circuit 110 and the second driving signal generation circuit 120 may generate the first driving signal and the second driving signal, respectively, and each of first driving signal generation circuit 110 and the second driving signal generation circuit 120 may include a number of transistors. At this time, the voltage level of the first driving signal may be higher than that of the second driving signal.

The control unit 130 may apply a control signal to gates of a number of transistors in the first driving signal generation circuit 110 and the second driving signal generation circuit 120 so as to turn the transistors on and off.

The first driving signal generation circuit 110 illustrated in FIG. 4 is merely an example of a circuit for generating the first driving signal of a high voltage level, exemplary embodiments of the present disclosure are not limited to the circuit. Rather, various circuits for generating a driving signal above the withstand voltage of a number of transistors in the second driving signal generation circuit 110 may be employed in exemplary embodiments of the present disclosure.

The first driving signal generation circuit 110 may include p-type transistors M1 and M2 and n-type transistors M3 and M4, and the transistors M1, M2, M3 and M4 may be connected to one another in series. The source of the transistor M1 is connected to the terminal of a power supply so that a supply voltage VDD can be applied thereto. The drain of the transistor M1 is connected to the source of the transistor M2, and the drain of the transistor M2 is connected to the source of the transistor M3. In addition, the source of the transistor M3 is connected to the drain of the transistor M4, and the source of the transistor M4 is referenced to ground.

A control signal Sg is applied to the gates of the transistors M1 and M4 from the control unit, while a constant voltage VDC is applied to gates of the transistors M2 and M3. The connection node between the transistor M2 and the transistor M3 is connected to the output terminal.

The second driving signal generation circuit 120 may include n-type transistors M5 and M6, and a pulse generation unit 125. The transistors M5 and M6 may be connected to each other in series.

The drain of the transistor M5 is connected to the output terminal, the source of the transistor M5 is connected to the drain of the transistor M6, and the source of the transistor M6 is connected to the pulse generation unit, such that a pulse signal having a low voltage level may be applied. A constant voltage VDC is applied to the gate of the transistor M5, and the control signal Sg is applied to the gate of the transistor M6 from the control unit 130.

Although the second driving signal generation circuit 120 includes the n-type transistors M5 and M6 in FIG. 4, it is apparent that the n-type transistors M5 and M6 may be replaced with the p-type transistors.

Assuming that the level of varying voltage of the first driving signal is higher than the transistors M5 and M6, since the first driving signal generation circuit 110 and the second driving signal generation circuit 120 have a common output terminal, the transistors M5 and M6 having a lower withstand voltage may be disabled due to the first driving signal of a high voltage level.

Figure 5:
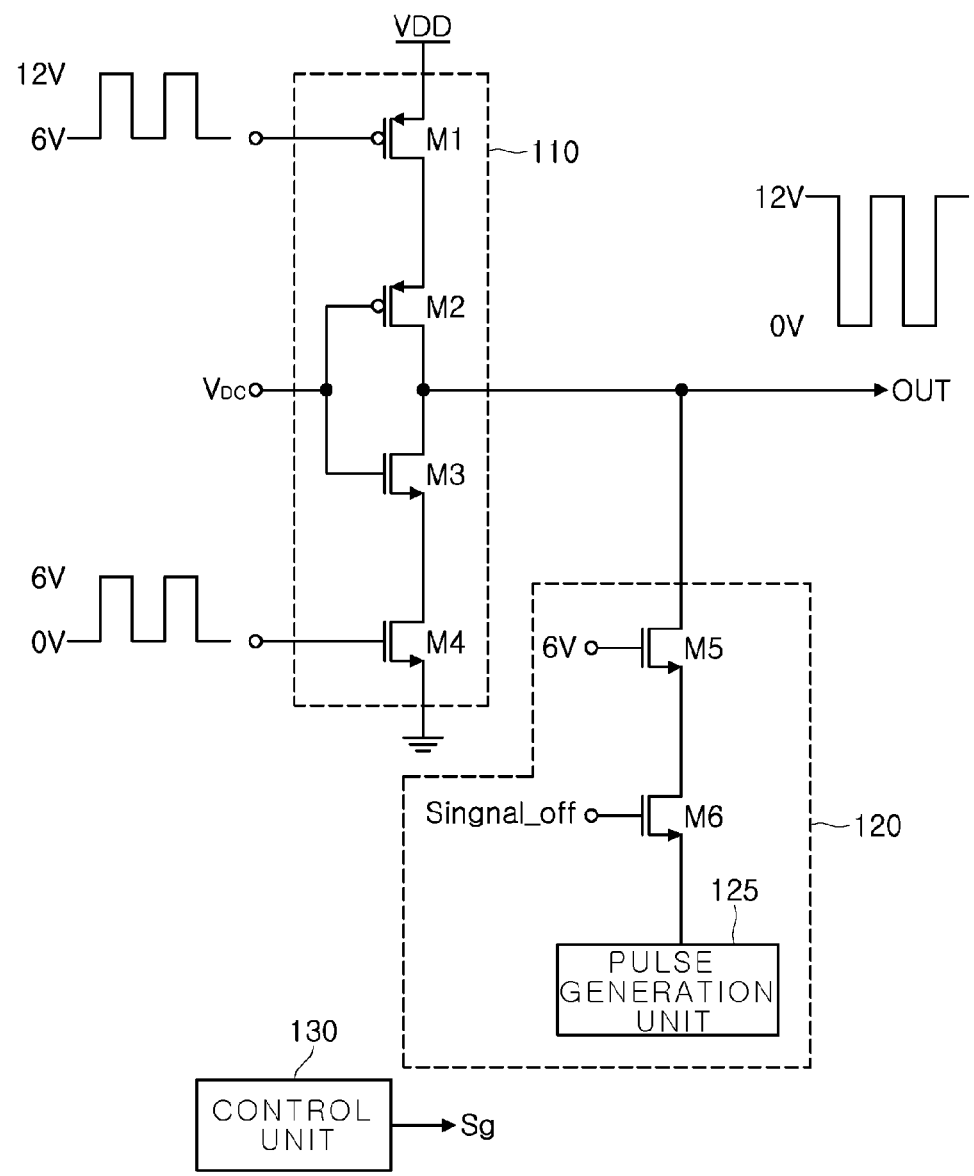
FIGS. 5 and 6 are diagrams illustrating operations of an apparatus for generating a driving signal according to an exemplary embodiment of the present disclosure.
Figure 6:
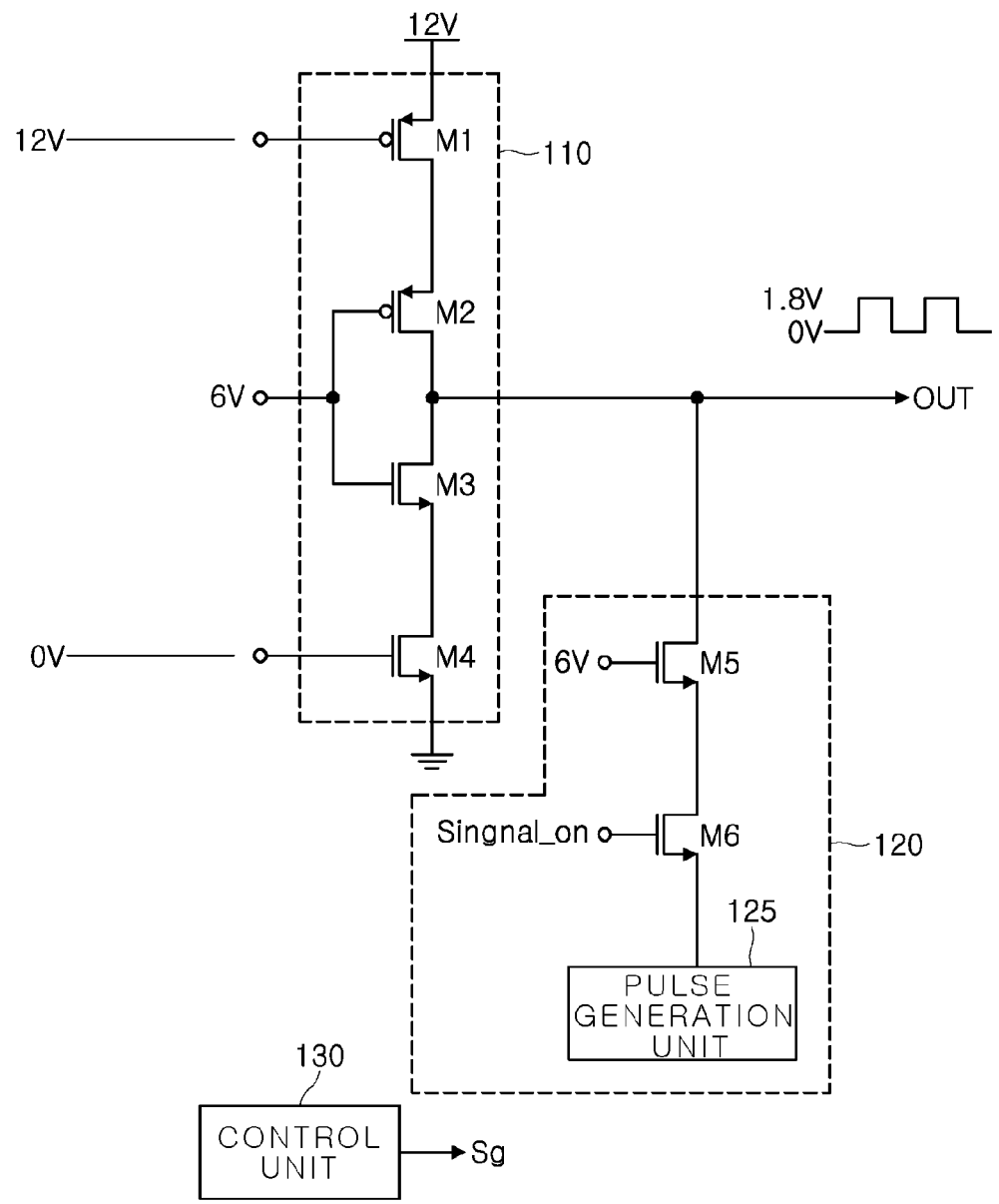

FIGS. 5 and 6 are diagrams illustrating operations of an apparatus for generating a driving signal according to an exemplary embodiment of the present disclosure. The apparatus for generating a driving signal according to the exemplary embodiment may generate first and second driving signals. A control unit 130 may change a control signal Sg to be provided to transistors M1, M4 and M6 according to an input signals from the outside so as to output the first and second driving signals selectively.

FIG. 5 is a diagram illustrating the operation of generating the first driving signal by the apparatus for generating a driving signal. In the case that the level of the supply voltage VDD is 12 V, the level of a constant voltage applied to transistors M2 and M3 is 6 V, equal to half of the level of the supply voltage VDD.

Clock signals are applied to the transistors M1 and M4 as control signals. The clock signals applied to the transistors M1 and M4 may have the same frequency and may be in-phase.

However, the clock signal applied to the transistor M1 may vary from 6 V to 12 V while the clock signals applied to the transistor M4 may vary from 0 V to 6 V.

The transistors M1 and M4 may be turned on and off at high and low levels, respectively, depending on the type thereof.

When clock signals having a high level are applied to the transistors M1 and M4, the transistor M1 is turned off and the transistor M4 is turned on. When the transistor M4 is turned on, the source of the transistor M3 is connected to a ground. Since the constant voltage of 6 V is applied to the gate of the transistor M3, the voltage of 0 V may be output to the output terminal. At this time, the transistor M1 is turned off, such that the source of the transistor M2 is floated, and accordingly the transistor M2 is also turned off.

When clock signals of a low level are applied to the transistors M1 and M4, the transistor M1 is turned on and the transistor M4 is turned off. When the transistor M1 is turned on, the voltage of 12 V is applied to the source of the transistor M2. Since the constant voltage of 6 V is applied to the gate of the transistor M2, the voltage of 12V may be output to the output terminal. At this time, the transistor M4 is turned off, such that the source of the transistor M3 is floated, and accordingly the transistor M3 is also turned off.

Assuming that the withstand voltage of the transistors M5 and M6 is 6 V, when the first driving signal generation circuit 110 outputs the voltage of 12 V to the output terminal, a voltage higher than the withstand voltage may be applied to the transistor M5 in the second driving signal generation circuit 120, so that it may be disabled. According to the exemplary embodiment, a constant voltage equal to the withstand voltage of the transistor M5 is applied to the gate of the transistor M5, and an off signal Signal_off is applied to the gate of the transistor M6 so that it is turned off. For example, the constant voltage of 6V is applied to the gate of the transistor M5.

In this case, the transistor M6 is turned off and the constant voltage of 6 V is applied to the gate of the transistor M5, such that the voltage of 6 V is present at the source of the transistor M5. That is, the voltage difference between the source and the drain of the transistor T5 is 6 V, which is below the withstand voltage, and thus the transistor M5 may not be disabled.

FIG. 6 is a diagram illustrating the operation of generating the second driving signal by the apparatus for generating a driving signal.

The constant voltage of 12 V may be applied to the gate of the transistor M1, the constant voltage of 6 V may be applied to the gates of the transistors M2 and M3, and the constant voltage of 0 V may be applied to the gate of the transistor M4. In this case, since there is no voltage difference between the gates and sources of the transistors M1 and M4, they are turned off, and accordingly, the transistors M2 and M3 are also turned off, such that the first driving signal generation circuit 110 may be floated.

An on signal Signal_on is applied to the gate of the transistor M6, such that the transistor M6 is turned on. Accordingly, a pulse signal having a low voltage level is applied to the source of the transistor M5. In this regard, the level of varying voltage of the pulse signal may be smaller than the withstand voltages of the transistors M5 and M6.

For example, if the pulse signal of a low voltage level varies from 0 V to 1.8 V, since the voltage of 6 V applied to the gate of the transistor M5 is greater than the voltage applied to the source thereof, the transistor M5 is turned on, such that the pulse signal of a low voltage level may be output to the output terminal.

As set forth above, according to exemplary embodiments of the present disclosure, a transistor having a low withstand voltage in a low-voltage driving signal generation circuit may be prevented from being disabled due to a high-voltage driving signal.

While exemplary embodiments have been shown and described above, it will be apparent to those skilled in the art that modifications and variations could be made without departing from the spirit and scope of the present disclosure as defined by the appended claims.

What is claimed is:

1. An apparatus for generating a driving signal, the apparatus comprising:
   a first driving signal generation circuit generating a first driving signal;
   a second driving signal generation circuit generating a second driving signal, the second driving signal generation circuit including at least two transistors and a pulse generation unit; and
   a control unit controlling the first and second driving signal generation circuits so that they generate the first and second driving signals selectively, wherein:
   the first and second driving signal generation circuits have a common output terminal, a maximum voltage level of the first driving signal is higher than a withstand voltages of the at least two transistors;
   one transistor among the at least two transistors is connected between the other transistor and the output terminal, a constant voltage equal to the withstand voltage is applied to the gate of the one transistor; and
   the control unit, when controlling the first driving signal generation circuit to generate the first driving signal, turns the other transistor off.

2. The apparatus of claim 1, wherein a maximum voltage level of a pulse signal output from the pulse generation unit is lower than the withstand voltage.

3. The apparatus of claim 1, wherein the at least two transistors are connected in series, wherein the one transistor is connected to the output terminal, and the other transistor is connected to the pulse generation unit.

4. The apparatus of claim 1, wherein the control unit, when controlling the second driving signal generation circuit to generate the second driving signal, turns the other transistor on.

5. An apparatus for generating a driving signal, the apparatus comprising:
   a first driving signal generation circuit generating a first driving signal;
   a second driving signal generation circuit generating a second driving signal, the second driving signal generation circuit including at least two transistors and a pulse generation unit; and
   a control unit controlling the first and second signal generation circuits so that they generate the first and second driving signals selectively, wherein:

the first and second driving signal generation circuits have a common output terminal, a maximum voltage level of the first driving signal is higher than a withstand voltages of the at least two transistors;

one transistor among the at least two transistors has a drain thereof connected to the output terminal, a gate thereof to which a constant voltage equal to the withstand voltage is applied and a source thereof connected to the drain of the other transistor; and the control unit, when controlling the first driving signal generation circuit to generate the first driving signal, has the source of the other transistor to be floated.

6. The apparatus of claim 5, wherein a maximum voltage level of a pulse signal output from the pulse generation unit is lower than the withstand voltage.

7. The apparatus of claim 5, wherein the source of the other transistor is connected to the pulse generation unit.

8. The apparatus of claim 5, wherein the control unit, when controlling the first driving signal generation circuit to generate the first driving signal, turns the other transistor off.

9. The apparatus of claim 5, wherein the control unit, when controlling the second driving signal generation circuit to generate the second driving signal, turns the other transistor on.

10. The apparatus of claim 5, wherein the first driving signal generation circuit includes at least one transistor.

* * * * *